US010158868B2

(12) United States Patent
Diard (10) Patent No.: US 10,158,868 B2
(45) Date of Patent: Dec. 18, 2018

(54) SYSTEMS AND METHODS TO LIMIT LAG BETWEEN A CLIENT AND A SERVER FOR REMOTE COMPUTING

(71) Applicant: Nvidia Corporation, Santa Clara, CA (US)

(72) Inventor: Franck Diard, Mountain View, CA (US)

(73) Assignee: Nvidia Corporation, Santa Clara, CA (US)

( * ) Notice: Subject to any disclaimer, the term of this patent is extended or adjusted under 35 U.S.C. 154(b) by 867 days.

(21) Appl. No.: 14/054,532

(22) Filed: Oct. 15, 2013

(65) Prior Publication Data

US 2015/0103894 A1    Apr. 16, 2015

(51) Int. Cl.
| | |
|---|---|
| *H04N 19/169* | (2014.01) |
| *H04N 19/127* | (2014.01) |
| *H04N 19/136* | (2014.01) |
| *H04L 29/06* | (2006.01) |
| *H04N 21/238* | (2011.01) |
| *H04N 21/24* | (2011.01) |
| *H04N 21/442* | (2011.01) |
| *H04N 21/6373* | (2011.01) |
| *H04L 12/811* | (2013.01) |
| *H04L 12/801* | (2013.01) |

(52) U.S. Cl.
CPC ......... *H04N 19/188* (2014.11); *H04L 65/80* (2013.01); *H04N 19/127* (2014.11); *H04N 19/136* (2014.11); *H04N 21/23805* (2013.01); *H04N 21/2401* (2013.01); *H04N 21/4424* (2013.01); *H04N 21/6373* (2013.01); *H04L 47/10* (2013.01); *H04L 47/38* (2013.01)

(58) Field of Classification Search
CPC .... H04N 19/48; H04N 19/147; H04N 19/188; H04L 67/12; H04L 67/325
USPC ........ 709/201, 217, 226, 228, 231; 714/752, 714/781
See application file for complete search history.

(56) References Cited

U.S. PATENT DOCUMENTS

| | | | | |
|---|---|---|---|---|
| 6,166,729 A | * | 12/2000 | Acosta | H04N 5/232 348/207.99 |
| 8,473,630 B1 | * | 6/2013 | Galligan | H04N 21/2402 709/224 |
| 8,560,753 B1 | * | 10/2013 | Hobbs | G06F 3/1454 345/2.1 |

(Continued)

OTHER PUBLICATIONS

What is a Socket (The Java Tutorials) (Coyright 1995, 2015, Oracle and Its Affiliates) Copied Apr. 19, 2017 fromhttps://docs.oracle.com/javase/tutorial/networking/sockets/definition.html.*

(Continued)

*Primary Examiner* — Ranodhi Serrao
*Assistant Examiner* — James N Fiorillo (57) ABSTRACT

Novel solutions are described herein for providing a consistent quality of service, latency-wise, for remote processing by managing the process queues in a processing server and temporarily pausing frame production and delivery to limit the lag experienced by a user in a client device. The claimed embodiments limit the latency (lag) experienced by a user by preventing the production rate of rendered frames at the server from significantly outperforming the decoding and display of the received frames in the client device and avoiding the resultant lag.

20 Claims, 5 Drawing Sheets

(56) References Cited

U.S. PATENT DOCUMENTS

| | | | |
|---|---|---|---|
| 2003/0012137 A1* | 1/2003 | Abdelilah | H04L 47/10 370/229 |
| 2006/0020710 A1* | 1/2006 | Rabenold | H04N 21/23439 709/236 |
| 2006/0126667 A1* | 6/2006 | Smith | H04N 7/17318 370/486 |
| 2007/0033494 A1* | 2/2007 | Wenger | H04N 19/147 714/776 |
| 2008/0005547 A1* | 1/2008 | Papakipos | G06F 9/5027 712/244 |
| 2008/0144505 A1* | 6/2008 | Isnardi | H04L 1/0083 370/235 |
| 2010/0269115 A1* | 10/2010 | Arimilli | G06F 9/4856 718/103 |
| 2011/0078532 A1* | 3/2011 | Vonog | G06F 3/1454 714/752 |
| 2011/0200304 A1* | 8/2011 | Rutledge | H04N 5/76 386/248 |
| 2011/0219287 A1* | 9/2011 | Srinivas | G06F 11/10 714/781 |
| 2012/0066405 A1* | 3/2012 | Speck | A63F 13/12 709/231 |
| 2012/0113091 A1* | 5/2012 | Isaacson | G06T 1/20 345/418 |
| 2012/0173662 A1* | 7/2012 | Hickey | G06F 3/14 709/217 |
| 2013/0050254 A1* | 2/2013 | Tran | G06F 3/14 345/629 |
| 2013/0218941 A1* | 8/2013 | Bushin | H04L 67/325 709/201 |
| 2013/0254330 A1* | 9/2013 | Maylander | H04L 65/607 709/217 |
| 2013/0344961 A1* | 12/2013 | Iannetta | G09G 5/026 463/36 |
| 2014/0189091 A1* | 7/2014 | Tamasi | H04L 43/0858 709/224 |
| 2014/0365551 A1* | 12/2014 | Mutschler | H04L 67/12 709/201 |
| 2015/0039763 A1* | 2/2015 | Chaudhary | H04L 47/125 709/226 |
| 2015/0092860 A1* | 4/2015 | Benight | H04N 19/48 375/240.18 |
| 2015/0193547 A1* | 7/2015 | Burkard | H04L 67/42 709/203 |
| 2015/0256822 A1* | 9/2015 | Gao | H04N 17/004 348/192 |

OTHER PUBLICATIONS

Network Socket (From Wikipedia, the free encyclopedia) Copied Apr. 19, 2017 fromhttps://en.wikipedia.org/wiki/Network_socket.*

Define Pause (Dictionary.Com)(Copied Apr. 19, 2017 from http://www.thesaurus.com/browse/pause.*

* cited by examiner

Figure 1

Exemplary Computer System 200

SYSTEMS AND METHODS TO LIMIT LAG BETWEEN A CLIENT AND A SERVER FOR REMOTE COMPUTING

BACKGROUND

Remote computing is the technique of abstracting some aspects of a computing system from a local host to a remote provider. Remote computing provides additional processing, capacity, storage, and security capabilities than would otherwise be available in local client devices Remote graphics computing is a particular implementation of remote computing that is rapidly gaining in popularity. Remote graphics computing is accomplished by performing the actual rendering and processing of the images constituting the graphical content displayed to the user in a remote device, such as a server. Once rendered, the image data is typically encoded (compressed) and transmitted as a stream of packets (bit stream) to the user's device (or client), where the encoded video stream is subsequently decoded and displayed.

User control input—typically responsive to the progression of images displayed—may be received from the user and directly transmitted back to the server, whereupon the input is recorded, and a new set of images may be processed, rendered, encoded, and then streamed back to the "client" device. This process may be performed continuously between the client device and the server, and often for substantially the entirety of the time the remote graphics computing session persists. Remote graphics computing allows users to view images while largely eliminating higher hardware requirements for the computing devices of users by abstracting the majority of the memory and graphical processing needs from the user's device and on to the server.

Unfortunately, a new host of challenges are also introduced by remote graphics processing over traditional, localized processing solutions. For example, additional steps are required to prepare the graphical output for display, such as compressing the video continuously in real time, decompressing the video at the user's client device, and continuously streaming data through a network connection. The challenge to perform these steps quickly and efficiently enough to not noticeably impact the user's experience while accommodating limitations due to the network infrastructure is considerable.

One potential drawback to remote processing is the introduction of additional latency experienced by the user. Latency is a measure of the responsiveness of the user's input to the server and back, and can be influenced by a host of variables, including how fast the server is running, the efficiency of the software and hardware running on the server, the network infrastructure, and the distance that the network has to travel to the user's device on the client side, and how fast the client device can decode the transmitted data. The further that the user's device is from the server for example, either in distance or network hops or network quality, the more latency that could be introduced due to lengthier transmission or routing times. Similarly, a user's device may be unable to decode the received data as quickly as the data is received, and lengthy data queues may result. Long latencies, often referred to as "lag," are undesirable, particularly during competitive games, time-sensitive interactions in games, and/or critical portions during videos, and can have a significant negative effect on user experience.

Unfortunately, many traditional remote processing solutions do not account for network or client attributed lag, considering them to be unavoidable or inevitable. At best, remote processing system operators may attempt to manage latencies by provisioning additional resources at the server side to expedite processing. However, this can increase capital expenditure costs for the remote processing system operators, potentially prohibitively, and is neither an efficient nor effective solution since the client device can still be overloaded. Still other remote processing system operators may attempt to avoid latencies altogether by limiting the applications offered, either by limiting the complexity of the images being rendered and the size and/or frequency of the data transmissions, providing only graphical content with asynchronous and/or mechanisms unrelated to timing. Unfortunately, this also restricts user choice in graphical content, and may prevent users from accessing a fuller library of graphical entertainment.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Embodiments of the claimed subject matter are directed to methods and systems that allow the delivery of a more consistent quality of service, latency-wise, for remote processing by managing the process queues in a processing server and temporarily pausing frame production and delivery to limit the lag experienced by a user in a client device. The claimed embodiments limit the latency (lag) experienced by a user by preventing the production rate of rendered frames at the server from significantly outperforming the decoding and display of the received frames in the client device and avoiding the resultant lag.

According to an aspect of the invention, a system is provided that implements such a method for limiting production of rendered frames to correspond to a rate in which the rendered frames are displayed in a client device. In an embodiment, the reception of tokens generated by the client device in response to successfully displaying a rendered frame is monitored, and based on the monitored reception, the production of the frame renderer is either maintained in high performing network conditions/client devices or automatically paused to compensate for relatively poor performing client devices/network connections until the client device is up to speed. Monitoring of the tokens can be performed in real time, and the pausing of the rendered frames may be performed dynamically as network and/or client conditions change.

According to a further embodiment, when the number of frames that have been rendered and sent to the client device—without receiving a token from the client device acknowledging the reception and display of the frames—exceeds a pre-determined (and configurable) threshold value, the production of frames of graphical content at the server is paused until a token is received. For each token received, a new frame is incrementally rendered and sent. According to such an implementation, the number of pre-rendered frames, e.g., "frames in flight" never exceeds the threshold value, with the net effect being a reduction in latency experienced by a user of the client device due to an overproduction of rendered frames.

BRIEF DESCRIPTION OF THE DRAWINGS

The accompanying drawings, which are incorporated in and form a part of this specification, illustrate embodiments of the invention and, together with the description, serve to explain features of the disclosure.

DETAILED DESCRIPTION

Reference will now be made in detail to embodiments of the claimed subject matter for managing applications to avoid low and/or compromised bandwidth in a cloud data center, examples of which are illustrated in the accompanying drawings. While the claimed subject matter will be described in conjunction with the disclosed embodiments, it will be understood that they are not intended to be limit to these embodiments. On the contrary, the claimed subject matter is intended to cover alternatives, modifications and equivalents, which may be included within the spirit and scope as defined by the appended claims.

Furthermore, in the following detailed descriptions of embodiments of the claimed subject matter, numerous specific details are set forth in order to provide a thorough understanding of the claimed subject matter. However, it will be recognized by one of ordinary skill in the art that the claimed subject matter may be practiced without these specific details. In other instances, well known methods, procedures, components, and circuits have not been described in detail as not to unnecessarily obscure aspects of the claimed subject matter.

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer generated step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present claimed subject matter, discussions utilizing terms such as "storing," "creating," "protecting," "receiving," "encrypting," "decrypting," "destroying," or the like, refer to the action and processes of a computer system or integrated circuit, or similar electronic computing device, including an embedded system, that manipulates and transforms data represented as physical (electronic) quantities within the computer system's registers and memories into other data similarly represented as physical quantities within the computer system memories or registers or other such information storage, transmission or display devices.

Remote Computing Model

Figure 1:
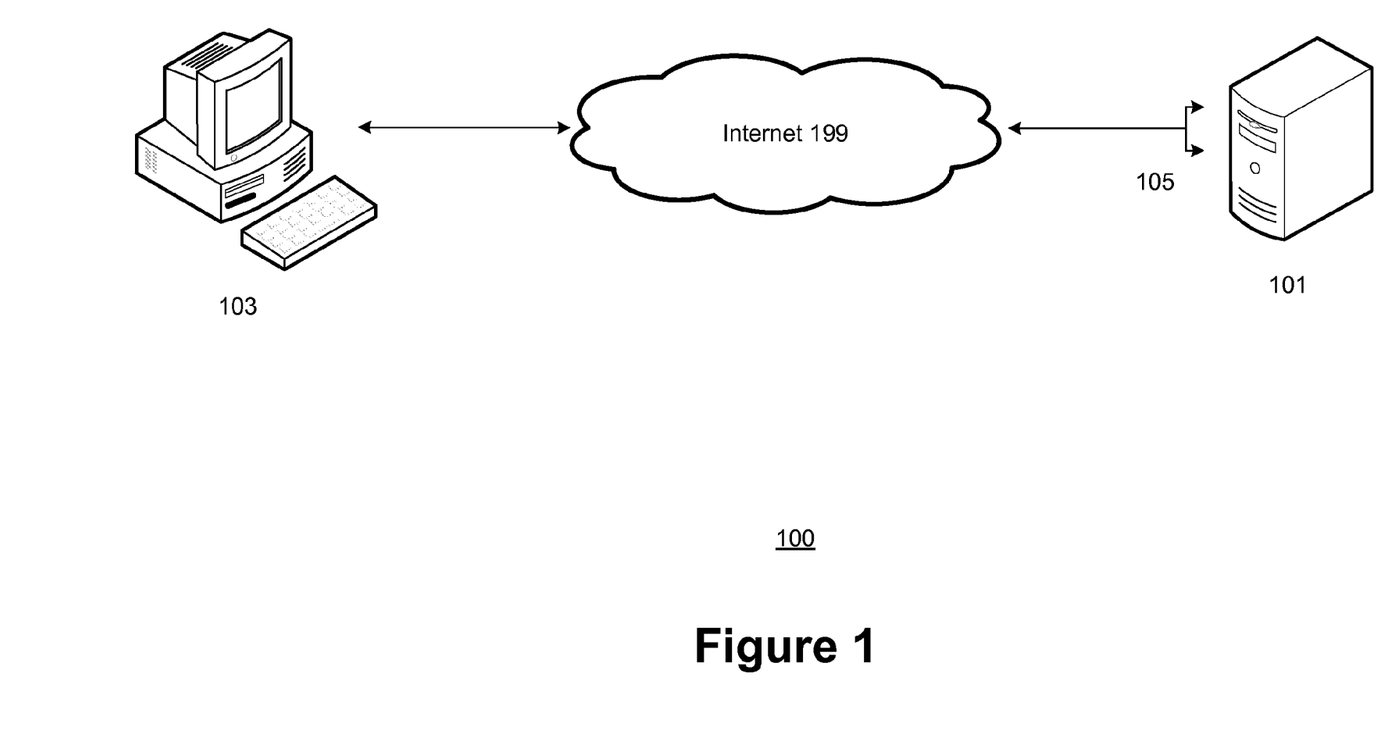
FIG. 1 is a block diagram of a remote computing model, in accordance with various embodiments of the claimed subject matter.

FIG. 1 is an illustration of an exemplary remote computing model 100, in accordance with various embodiments of the present invention. As presented in FIG. 1, remote computing model 100 may include a server 101 communicatively coupled to a client device 103 via the Internet 199. According to various embodiments, the server 101 may comprise a computing system with graphics processing capabilities. The server 101 may, for example, comprise any computing system with a discrete graphics processing unit. The server 101 may comprise a physical computing device, such as a personal computer, a server blade, or data center. According to alternate embodiments, the server 101 may comprise one or more instantiated virtual servers. The server 101 may, in some implementations, be configured to comprise multiple logical partitions corresponding to the virtual servers, and which one or more software applications (e.g., games) or other display content (streaming videos) may be hosted on and streamed and/or executed from. Users may receive processed data (e.g., rendered video frames) from the server 101 in a client device 103 by initiating a remote computing session to the remote server 101 through a network connection (e.g., through the Internet 199). According to further embodiments, the remote computing session may be established by creating one or more temporary channels between the client device 103 and server 101 through one or more network sockets 105.

The client device 103 may comprise a variety of consumer and personal electronic devices. Examples of the client device 103 include, but are not limited to: personal desktop or laptop computers, mobile cellular handsets (e.g., smartphones), tablet computer devices, set top boxes, video game console devices, or any other device capable of displaying pre-rendered graphical content and receiving user input. The client device 103 may belong to a local area network (LAN), and connected to one or more gateways of the Internet 199 through a routing device and/or modem. According to some embodiments, the client device 103 may include, and/or be communicatively coupled with a display device, such as a screen or communicatively coupled monitor. User input may be submitted to the client device 103—in response to displayed graphical content for example—and forwarded on to the server 101. The user input may be submitted through a user input device, which may be implemented as, for example, a mouse, a keyboard, a stylus, controller, remote control, touch screen, etc, and communicatively coupled to the client device 103.

The graphical content generated in the server 101 and received in the client device 103 may comprise, in some embodiments, one or more series of images that are processed and rendered in one or more graphics processing units (GPUs) comprised in the server 101. Once rendered, the images or frames may be compressed into an encoded video, buffered, and then streamed as a plurality of data packets to a client device 103. The encoded data is received in the client device 103, decoded (decompressed), and displayed to the user (e.g., in a display device). In some instances however, the client device 103 may not be able to decode and/or display the graphical content from the server as quickly as the content is produced. Inefficiencies in the network connection coupling the client device 103 and server 101, or inefficacy of decoders in the client device 103 may contribute to this problem, resulting in excessive buffering of received rendered content, or a substantial number of rendered graphical content that may be delayed "in flight," that is, during transmission. Under these circumstances, graphical content rendered in response to user input may be produced and transmitted with little to no delay, but may nonetheless be stuck in a buffer, input queue or delayed during transmission. By the time the rendered content is decoded and displayed to the user, significant time (seen as lag to the user) may have elapsed since the user input was received.

According to an aspect of the present invention, for each rendered and compressed frame received by the client device 103, a reply token (via TCP/IP protocol for example) is sent back to the server that acknowledges the successful receipt of the unit of graphical content. According to one embodiment, the token may be sent to the server 101 through a different network socket than a network socket through which user input is transmitted to the server 101. According to various embodiments, the receipt of the token in the server 101 may be continuously monitored and rendered and compressed frames are sent from the server 101 continuously for so long as a corresponding token from the client device 103 is received in the server for each transmitted frame. In still further embodiments, rendering, compression, and transmission of frames may continue until the number of un-received tokens exceeds a pre-determined threshold. Once the (configurable) threshold is exceeded, rendering is paused until one or more previously un-received tokens are received, at which point rendering, compression, and transmission may continue incrementally to correspond with the further receipt of tokens.

By temporarily pausing the production and transmission of rendered graphical content to correspond to the reception of acknowledgement tokens in the server, the production of graphical content in the server is throttled, thereby avoiding excessive latency (lag) attributable to a surplus of produced content.

Example Computing Device

Figure 2:
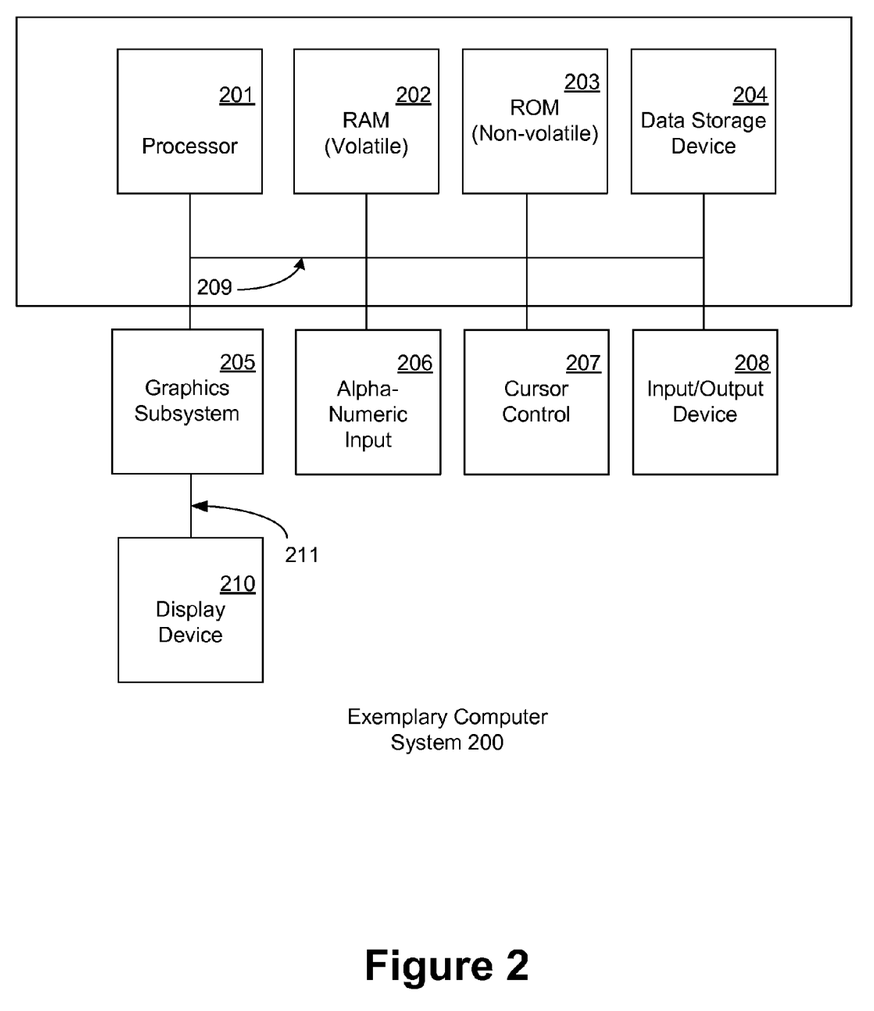
FIG. 2 is a block diagram of an exemplary computing system, in accordance with conventional practice.

As presented in FIG. 2, a system upon which embodiments of the present invention may be implemented includes a general purpose computing system environment, such as computing system 200. In an embodiment, a server, such as the server 101 described above with respect to FIG. 1 may be implemented as computing system 200. In alternate embodiments, a client device, such as client device 103 likewise described above with respect to FIG. 1 may be implemented instead of, or in addition to the server as computing system 200. In its most basic configuration, computing system 200 typically includes at least one processing unit 201 and memory, and an address/data bus 209 (or other interface) for communicating information. Depending on the exact configuration and type of computing system environment, memory may be volatile (such as RAM 202), non-volatile (such as ROM 203, flash memory, etc.) or some combination of the two.

Computer system 200 may also comprise an optional graphics subsystem (such as a graphical processing unit or GPU) 205 for rendering graphical content—e.g., as a sequence of frames. Server 101 may include such a graphics subsystem 205, while in some instances, client device 103 may not. According to some embodiments, the rendered graphical content may be displayed to the computer user, e.g., by displaying information on an optional display device 210, connected to the computer system 200 by a video cable 211. According to embodiments of the present claimed invention, the display device may be physically mounted on the computing system 200 and coupled to the graphics subsystem 205. Alternatively, the graphics subsystem 205 may be coupled to the display device 210 through a video cable 211, or indirectly via wireless means. Computing system 200 implemented as a server may process and render graphical images in graphics subsystem 205 according to programmed instructions stored in memory (202, 203) and processed in processing unit 201. The graphical output produced by the server may be received in a client device implemented as a second computer system 200, decoded in the processing unit 201 of the second computer system 200 and displayed to the user in the display device 210.

Additionally, computing system 200 may also have additional features/functionality. For example, computing system 200 may also include additional storage (removable and/or non-removable) including, but not limited to, magnetic or optical disks or tape. Such additional storage is illustrated in FIG. 2 by data storage device 207. Computer storage media includes volatile and nonvolatile, removable and non-removable media implemented in any method or technology for storage of information such as computer readable instructions, data structures, program modules or other data. RAM 202, ROM 203, and data storage device 207 are all examples of computer storage media.

Computer system 200 also comprises an optional alphanumeric input device 206, an optional cursor control or directing device 207, and one or more signal communication interfaces (input/output devices, e.g., a network interface card) 209. Optional alphanumeric input device 206 can communicate information and command selections to central processor 201. Optional cursor control or directing device 207 is coupled to bus 209 for communicating user input information and command selections to central processor 201. Signal communication interface (input/output device) 209, also coupled to bus 209, can be a serial port. Communication interface 209 may also include wireless communication mechanisms. Using communication interface 209, computer system 200 can be communicatively coupled to other computer systems over a communication network such as, for example, the Internet or an intranet (e.g., a local area network), or can receive data (e.g., a digital television signal).

Dynamically Limiting Lag During Remote Computing

Figure 3:
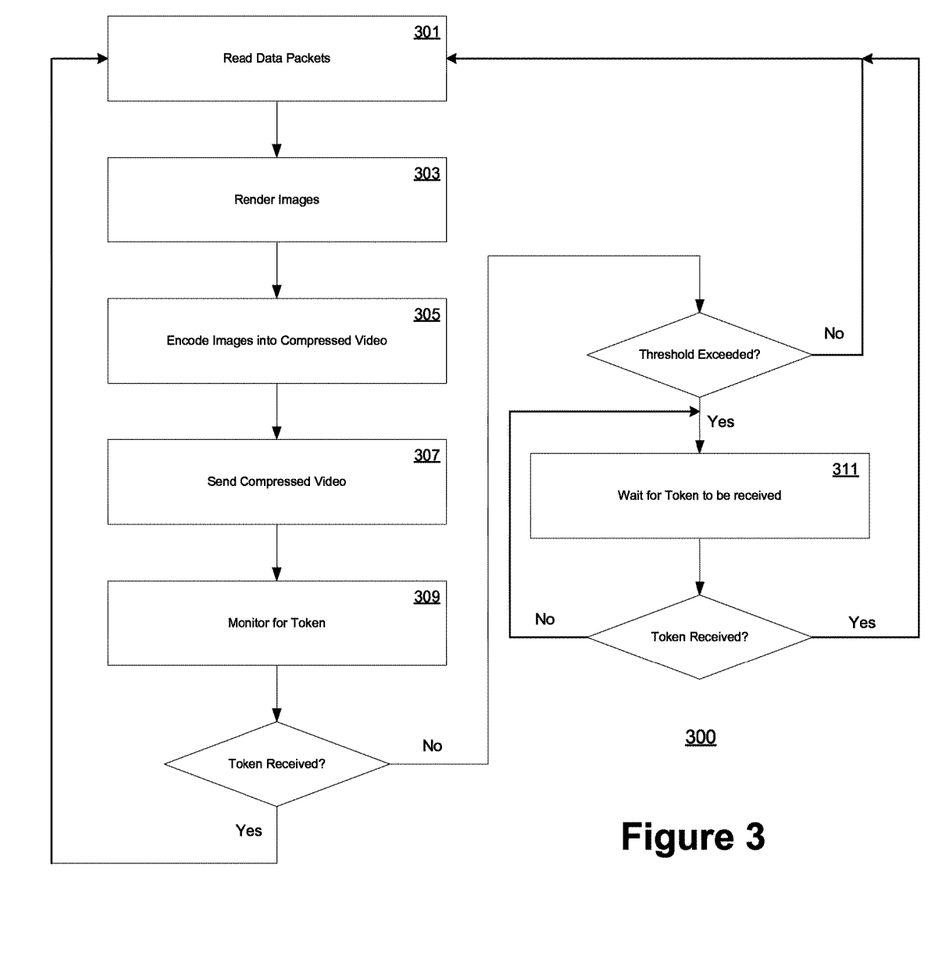
FIG. 3 is an illustration of a flowchart of a process for dynamically limiting lag between a client and a server during remote computing, in accordance with various embodiments of the claimed subject matter.

FIG. 3 is an illustration of a flowchart 300 of a computer implemented process for dynamically limiting lag between a client and a server during remote computing, in accordance with an embodiment. Specifically, the method describes the steps performed to dynamically manage the production rate of graphical images to prevent saturating an input queue of the client device, or to mitigate poor network conditions. Steps 301-311 describe the steps comprising the process depicted in the flowchart 300 of FIG. 3. In one embodiment, the flowchart 300 is performed by a server (e.g., server 101) remotely located from a local client device (e.g., client device 103).

At step 301, data input is read by a processor in a server. The data input may comprise user control input submitted via a remote client device, such as user input responsive to a graphical image. According to some embodiments, the data input may be transmitted via a network connection communicatively coupling the server with a client device through a first network socket. In still further embodiments, the input is received as a stream of data packets, or "bit-stream," and is temporarily stored at the server in a network input queue. In an embodiment, a first processing thread or loop (e.g., an input acquisition thread) executing in the server reads the data from the network input queue and simulates the input in the data packet in the local operating system executing on the server. This thread or loop may be performed iteratively in order of reception, for each packet in the input buffer.

At step 303, graphical content (e.g., a frame, or sequence of frames) is rendered in response to the simulated input in step 301. The graphical content may be rendered in a graphical processing unit of the server, for example. According to some embodiments, not all simulated input requires newly rendered graphical content. According to such implementations, step 303 may include, or be preceded by, a determination whether a change in the last rendered image is necessary, and graphical content may be generated accordingly. Once rendered, the sequence of frames is encoded into a video file of a compressed format at step 305, and streamed as stream of compressed video packets to the client device over the network connection at step 307. In an embodiment, encoding (step 305) and streaming (step 307) of the graphical content may be performed in a second processing thread or loop (e.g., an encoding thread) executing in the server. This thread, like the first processing thread, may also be performed iteratively, in the order of production from the graphical processing unit, for each rendered frame. According to various embodiments, the compressed format may be consistent with any media (music, video) compression standard.

At step 309, a communication channel (e.g., a network socket) between the client device and server is monitored for the receipt of a communication from the client device that acknowledges the successful receipt and display in the client device for each rendered video packet generated in the server. According to further embodiments, the communication channel may comprise a second network socket that is different from the communication channel supplying the data input in step 301. Acknowledgement from the client device may consist of an acknowledgement token, in some embodiments. The server continues to render and transmit graphical content by repeating steps 301-309 as long as tokens continue to be received from the user, and graphical content is required (e.g., either through user control input, or according to the media content being rendered).

If, however, a token is not received by the server responsive to the production and transmission of rendered output, the server may further track the number of contiguous "missing" or un-received tokens. When the number of contiguous un-received tokens exceeds a threshold value, the first processing thread (and by extension the second processing thread) is paused (at step 311) until at least one previously un-received token is received. Once a previously un-received token is received, reading of the data input and production of graphical content may proceed incrementally, for each token that is subsequently received. That is, each received token from a previously rendered and transmitted frame will cause the reading (in step 301), rendering (in step 303), encoding (in step 305) and transmission (step 307) of one additional data packet and/or unit of content.

According to some embodiments, one or both of monitoring the network socket for received tokens and management of the first and second processing threads may be performed by a third processing thread or loop (e.g., a frame lag control thread) executing in the server. In still further embodiments, the third processing thread assists in the management of the first and second processing threads with an array of events. The array of events may be implemented as, for example, a ring buffer of m numbered elements that loops back to the beginning after each completed traversal. Each element of the array may consist of an operating system event, the value of which may be set to either one of two states—either signaled or unsignaled. In an embodiment, the operating system events interact with the operating system executing on the server. These interactions may include, for example, a signal event that sets the flag for a processing thread which allows the thread to proceed, and an unsignaled event (or, specifically, a wait for event) that will pause a processing thread until the thread is signaled.

Events in the array are acquired (e.g., referenced) by the server in sequence. When an element in the array buffer is acquired by the server, the server may allow a processing thread to proceed (if the corresponding event is signaled, for example), or, alternately, to be paused or blocked (if the corresponding event is unsignaled), and prevented from completing. According to an embodiment, the value of the elements in the array of events are either signaled or unsignaled, and may include a handle (e.g., a 32 bit value) that maps to a resource (data structure) in the operating system. By setting the values of the array elements, the third processing thread is able to continue, or pause, the output of the first processing thread dynamically, in response to determined adverse conditions (e.g., poor network and/or client performance).

For example, the third processing thread may pause the first processing thread by passing the handle of an element in the array to the operating system to signal the event as unsignaled, when a token from the client device has not been received in response to the transmission of a rendered frame. When the server iterates through the array of events and reaches the element, the server will reference the value of the element and pause (or block) the first processing thread from further performance since the event is unsignaled, and progress through the next events in the array iteratively. The first processing thread is thereafter paused until a subsequent signaled event is referenced by the server.

In still further embodiments, when the array of events is initialized in the server, a number of events may be pre-set as being signaled. This pre-set number of events may correspond to the threshold, that is, the number of un-received tokens from transmitted processed output that may be sent before further processing is paused. For example, if the threshold is set to three, the first three elements in the array of events will be set to signaled, and the server will iteratively perform the data acquisition, rendering, encoding, and transmission, of at least the next three items in the network input queue. According to an embodiment, receipt of a token in response to the transmitted output will cause the third processing thread to set the next value in the array of events to be signaled. If the reception of the tokens corresponds to the transmission of the rendered output, the first and second processing threads are allowed to continue iteratively through their respective queues and/or instruction stacks. If, however the number of frames of rendered output is transmitted without receiving a responsive token from the client device, the third processing thread may set a value in the array to be unsignaled, causing the first and second processing threads to be paused when the array is iterated through by the server and the unsignaled element is referenced.

Exemplary Array of Events

Figure 4:
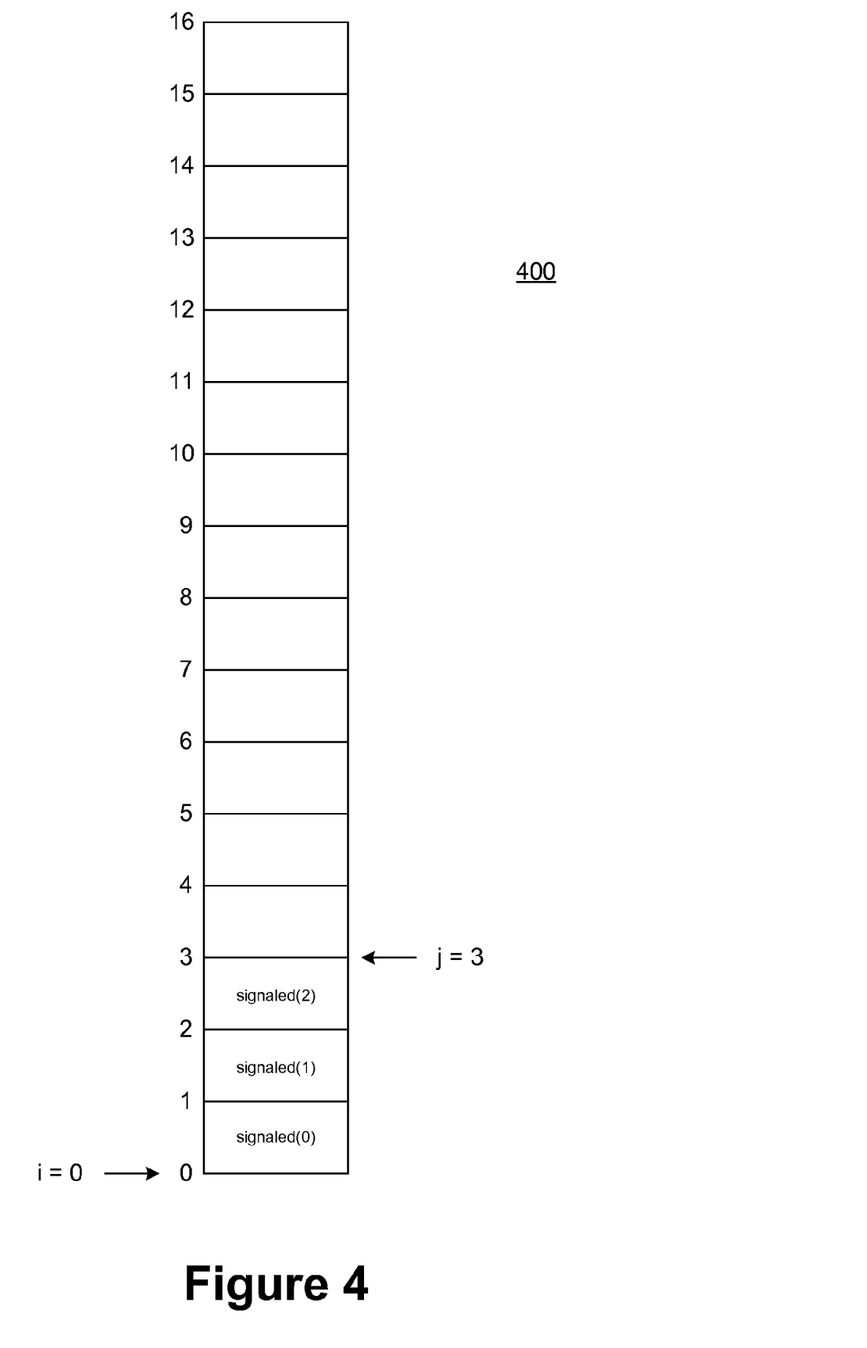
FIG. 4 is a illustration of an exemplary array of events in accordance with various embodiments of the claimed subject matter.

FIG. 4 is an illustration of an exemplary array of events 400, in accordance with various embodiments of the present invention. The array of events 400 may be implemented in a server, and managed by a frame lag control thread executing in the server to start, or pause, one or more other processing threads (e.g., input acquisition thread, encoding thread) executing in the server. As presented in FIG. 4, the array of events 400 comprises an array of elements that correspond to operating systems events (e.g., with a handle corresponding to an event) and a value that indicates the state of the event, either signaled or unsignaled.

According to an aspect of the instant invention, the server may reference the elements in the array of events 400 iteratively. As presented in FIG. 4, for example, the server may start at an address of the array (e.g., at the address corresponding to the current address pointer of the server "i"), and each time an event is performed by the operating system, the address of the pointer is incremented. As depicted, the server may be initialized to begin at the first address (e.g., i=0) of the created array. According to some embodiments, in order to manage the input acquisition thread, the frame lag control thread sets the values of the array of events 400—as described above with respect to FIG. 3.

According to still further embodiments, an configurable number (n) of elements in the array 400 may be pre-initialized to comprise signaled events, with additional elements being pre-set to comprise signaled events, pending the receipt of acknowledgment tokens from the client device responsive to transmitted output. Under such implementations, the frame lag control thread may iterate asynchronously from the processing of the server through the array. For example, the frame lag control thread will iteratively set the values of the element in the array at the address corresponding to the current address pointer+n. As depicted in array 400, n is set to 3, and the current address pointer of the frame lag control thread "j" is initialized at a value of 3 addresses above the current address pointer of the server. Each time a frame or unit of rendered output is transmitted, the pointer of the frame lag control thread is incremented. If a token is received for the transmitted frame, the element at the address in the array corresponding to the pointer of the frame lag control is set to signaled. Alternatively, if a token is not received in response to the transmitted frame, the element is set to unsignaled (or wait for) and the pointer is again incremented.

By pre-setting the events as signaled and iteratively traversing the array 400 at a constant, asynchronous position from the server's execution, the third processing thread is able to maintain a small buffer of produced output that can withstand fluctuations in network or client conditions without unnecessarily pausing production or otherwise negatively impacting the production and transmission of rendered output. When conditions worsen, or last for a significant amount of time however, processing of additional output may be halted until conditions are stabilized, and will proceed according to the capabilities of the network and/or client.

Displaying Graphical Output in Client Device

Figure 5:
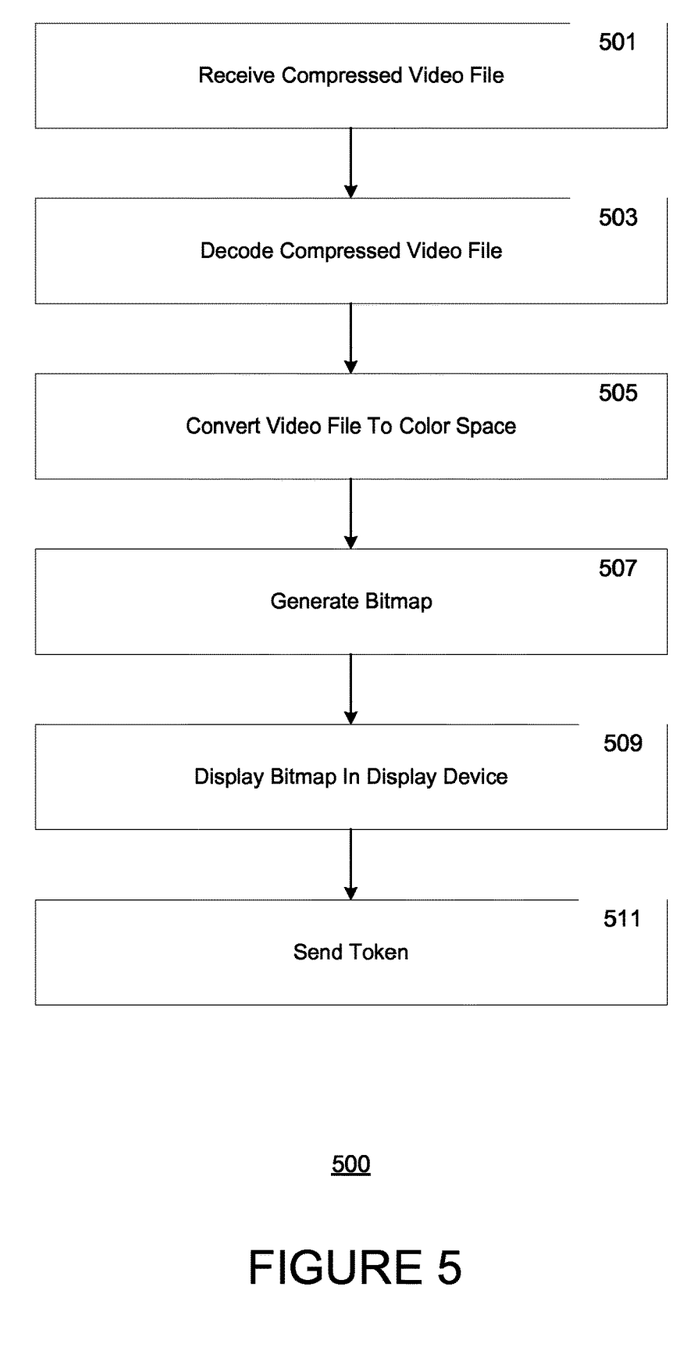
FIG. 5 is an illustration of a flowchart for displaying graphical output in a client device, in accordance with various embodiments of the claimed subject matter.

FIG. 5 is an illustration of a flowchart 500 of a computer implemented process for displaying graphical output in a client device, in accordance with an embodiment. Specifically, the method describes the steps performed in a client device (e.g., client device 103 described above) to display images rendered in a remote processing device, such as server 101 described above with respect to FIG. 1. Steps 501-511 describe the steps comprising the process depicted in the flowchart 500 of FIG. 5. In one embodiment, the flowchart 500 is performed in a client device with physically incorporated display screens and (wireless) networking capability, which may include (but are not limited to): mobile smartphones, laptop or tablet computers, personal digital assistants, handheld video game consoles. In still further embodiments, the flowchart 500 is performed in a client device with a communicatively coupled display device. Under these embodiments, the client device may include (but are not limited to): personal computers, set top boxes, media players, and video game consoles, with communicatively coupled monitors, televisions, projection screens, or other devices capable of displaying graphical output.

At step 501, a network stream of compressed video data packets is received in a client device. The compressed video data packets may comprise a plurality of encoded data packets, and may be received in a data buffer in the client device (e.g., a network socket buffer). According to one embodiment, the data packets may be encoded using a video compression standard, such as h.264. The compressed video data packets may further be rendered and transmitted to the client device in response to a user input submitted by a user of the client device. At step 503, the encoded video data packets is subsequently decoded, by a processor in the client device for example, and converted into data points which are then plotted in a color space at step 505. The color space may comprise an absolute color space such as an RGB color space. Alternatively, the color space may comprise a chrominance/luminance color space such as a YUV color space.

A bitmap is then generated from the plotted data points at step 507, and finally displayed in the display device at step 509. Once the received data is decoded and displayed, an acknowledgement token is delivered through a network connection to the producer (e.g., the server) of the compressed video data packets at 509. According to an embodiment, the process 500 may be repeated for each received video packet, and may be performed as quickly as the client device is capable of. Production at the server may be paused, temporarily, when too many video packets have been sent to the client device before any corresponding acknowledgement tokens have been returned, as described herein. By implementing these production throttling measures, oversaturation of data buffer is avoided, and the effects of network inefficiencies is mitigated to reduce the amount of latency experienced by a user of the client device.

As described herein, embodiments of the claimed subject matter have been provided which avoid circumstances that can lead to lag in remote processing systems by monitoring and managing production rates of rendered frames using an array of signaled events. The claimed embodiments not only reduce, if not eliminate entirely lag due to less capable client hardware devices, but are still able to support high production rates for high performing client devices and/or network conditions without comprising the rate of production. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
   reading, by a first processing thread executing in by a first processing thread executing in a server device, a plurality of data packets from a remote client device via a network connection communicatively coupling a network input socket of the server device with the remote client device, wherein the plurality of data packets corresponds to user control input and references an element in an array of operating system events, each event of the array of operating system events comprises either a signaled event or an unsignaled event;

when the element in the array of operating system events comprises an unsignaled event, pausing the reading of the plurality of data packets and incrementing an index of the array of operating system events; and when the element in the array of operating system events comprises a signaled event, further comprising:

rendering a plurality of images based on the plurality of data packets;

encoding, by a second processing thread executing in the server device, the plurality of images into a plurality of compressed video files;

sending the plurality of compressed video files to the remote client device through the network connection;

monitoring a second network input socket for a reception of a token from the remote client device for each of the plurality of compressed video files received by the remote client device, wherein the token indicates a receipt of a compressed video file by the remote client device;

determining that a token in response to a compressed video file has not been received; and pausing the reading of the plurality of data packets by the first processing thread whenever the number of compressed video files that have been sent without receiving a token from the remote client device exceeds a threshold number.

2. The method according to claim 1, wherein each data packet of the plurality of data packets received from the remote client device is stored in a network input buffer, further wherein each element of the array of operating system events has a handle corresponding to an operating system resource.

3. The method according to claim 2, wherein reading the plurality of data packets comprises:

referencing an element in the array of operating system events comprising a handle corresponding to an operating system resource;

when the element in the array of operating system events comprises a signaled event, performing the reading of the plurality of data packets and incrementing an index of the array of operating system events; and when the element in the array of operating system events comprises an unsignaled event, pausing the reading of the plurality of data packets.

4. The method according to claim 3, wherein the array of operating system events is initialized such that a first n number of elements of the array comprises signaled events, wherein n corresponds to the threshold number.

5. The method according to claim 4, wherein the third processing thread iterates through the array of operating system events incrementally for each received token from the remote client device.

6. The method according to claim 5, wherein the managing comprises:

for each compressed video file sent to the remote client device, referencing the array of operating system events at a framerate lag control index, the framerate lag control index corresponding to the current index+n;

when no token has been received from the remote client device in response to the compressed video file sent, setting the framerate lag control element as unsignaled;

when a token is received from the remote client device in response to the compressed video file sent, setting the element in the array of operating system events at the current index as signaled; and incrementing the framerate lag control index.

7. The method according to claim 1, wherein the plurality of data packets from the remote client device comprise a plurality of user input actions received in the client device via a user input device.

8. The method according to claim 7, wherein the user input device comprises at least one of the following group of devices:

a mouse; a keyboard; a stylus; a touch screen device; a remote control device.

9. The method according to claim 1, wherein the reading comprises simulating the input in a local operating system executing in the server device by the first processing thread.

10. The method according to claim 1, wherein the data packets are temporarily stored in a network input queue of the server device.

11. The method according to claim 1, wherein the monitoring, the determining, and the managing are performed by a third processing thread executing in the server device.

12. The method according to claim 1, wherein the array of operating system events comprises a ring buffer of operating system events.

13. The method according to claim 1, wherein the rendering the plurality of graphical images is performed by a graphical processing unit (GPU) comprised in the server device.

14. The method according to claim 1, wherein the threshold number is dynamically configurable.

15. The method according to claim 1, wherein the server device comprises a computing device with a processor and a graphics processing unit.

16. The method according to claim 1, wherein the client device is communicatively coupled to a display, and is comprised from one of the following:

a desktop computer; a laptop computer; a set-top box; a tablet computer; a mobile phone device, a video game console device.

17. The method according to claim 1, wherein the compressed video file comprises an h.264 video file.

18. A system, comprising:

a server device;

a processor, comprised in the server device and operable to execute:

a first processing thread configured to receive a plurality of data packets from a remote client device, wherein the plurality of data packets corresponds to user control input:

a second processing thread configured to send a plurality of rendered images based on the plurality of data packets to the client device;

a third processing thread configured to receive a corresponding acknowledgement from the client device and to manage the first and second processing threads such that the first processing thread is paused so long as a number of plurality of rendered images sent to the client device without receiving a corresponding acknowledgement packet exceeds a threshold value, wherein:

an array of operating system events is created in the server device and is managed by the third processing thread by setting a value of a plurality of elements comprising the array of operating system events to one of a signaled event or an unsignaled event; and the third processing thread is further configured to monitor communications with the client device by iterating through the array of operating system events incrementally for each acknowledgment packet received from the client device and setting the element referenced by the current index of the array of operating system events to a signaled event.

19. A system, comprising:

a server device;

a processor, comprised in the server device, wherein the processor is configured to perform a method of frame lag control, said method comprising:

reading, by a first processing thread executed by said processor, a plurality of data packets from a remote client device via a network connection communicatively coupling a network input socket of the server device with the remote client device, wherein the plurality of data packets corresponds to user control input and references an element in the array of operating system events, each event of the array of operating system events comprises either a signaled event or an unsignaled event;

when the element in the array of operating system events comprises an unsignaled event, pausing the reading of the plurality of data packets and incrementing an index of the array of operating system events; and when the element in the array of operating system events comprises a signaled event, further comprising:

rendering a plurality of images based on the plurality of data packets;

encoding, by a second processing thread executing in the server device, the plurality of images into a plurality of compressed video files;

sending the plurality of compressed video files to the remote client device through the network connection;

monitoring a second network input socket for a reception of a token from the remote client device for each of the plurality of compressed video files received by the remote client device, wherein the token indicates a receipt of a compressed video file by the remote client device;

determining that a token in response to a compressed video file has not been received; and pausing the reading of the plurality of data packets by the first processing thread whenever the number of compressed video files that have been sent without receiving a token from the remote client device exceeds a threshold number.

20. A method comprising:

receiving, in a client device, a compressed video file; decoding the compressed video file into a decoded video file;

converting the decoded video file into a color space; generating a bitmap for the color space;

displaying the bitmap in a display device communicatively coupled to the client device;

sending a token to a remote server, the token being sent through a network socket communicatively coupling the remote server with the client device; and pausing reading of a new compressed video file by a first processing thread in the remote server whenever a number of compressed video files that have been sent by the remote server without receiving a responsive token from the client device exceeds a threshold wherein:

an array of operating system events is created in the remote server and is managed by another processing thread in the remote server by setting a value of a plurality of elements comprising the array of operating system events to one of a signaled event or an unsignaled event; and the another processing thread in the remote server monitors communications through the network socket by iterating through the array of operating system events incrementally for each token received from the client device and setting the element referenced by the current index of the array of operating system events to a signaled event.

* * * * *